United States Patent
Námisňák

(10) Patent No.: US 6,863,240 B1
(45) Date of Patent: Mar. 8, 2005

(54) HOVERING BODY

(76) Inventor: Jan Námisňák, 252 10, Lisnice 386E (CZ)

(*) Notice: Subject to any disclaimer, the term of this patent is extended or adjusted under 35 U.S.C. 154(b) by 0 days.

(21) Appl. No.: 10/110,607

(22) PCT Filed: Oct. 11, 2000

(86) PCT No.: PCT/CZ00/00074
§ 371 (c)(1),
(2), (4) Date: Jun. 27, 2002

(87) PCT Pub. No.: WO01/26966
PCT Pub. Date: Apr. 19, 2001

(30) Foreign Application Priority Data

Oct. 12, 1999 (CZ) .............................................. 3595-99

(51) Int. Cl.⁷ ............................................. B64C 27/00
(52) U.S. Cl. .................... 244/17.19; 244/52; 244/73 C; 244/87
(58) Field of Search ............................... 244/17.19, 52, 244/73 C, 12.5, 87

(56) References Cited

U.S. PATENT DOCUMENTS

| | | | | |
|---|---|---|---|---|
| 4,200,252 A | * | 4/1980 | Logan et al. ............ | 244/17.19 |
| 5,240,205 A | * | 8/1993 | Allongue ................. | 244/17.19 |
| 5,676,335 A | * | 10/1997 | Murgia et al. ........... | 244/17.19 |
| 6,036,141 A | * | 3/2000 | Clay ....................... | 244/17.19 |
| 6,352,220 B1 | * | 3/2002 | Banks et al. ............. | 244/17.19 |
| 6,416,015 B1 | * | 7/2002 | Carson .................... | 244/17.19 |

FOREIGN PATENT DOCUMENTS

| EP | 0524044 | 1/1993 |
|---|---|---|
| FR | 1332300 | 12/1963 |

* cited by examiner

Primary Examiner—J. Woodrow Eldred
(74) Attorney, Agent, or Firm—Ostrolenk, Faber, Gerb & Soffen, LLP

(57) ABSTRACT

To achieve the required optional conformability and navigability of the hovering motion of the hovering body in a free liquid environment, the hovering body is equipped with a suitable created mechanism for optional control of direction and/or the position of the hovering motion in the form of the basic jacket suitably equipped with at least one slot jet where the basic jacket is suitably connected to the elongated jacket mechanism for the optional stabilization of the direction and/or the position of the hovering motion suitably equipped with at least one uplift component.

14 Claims, 6 Drawing Sheets

HOVERING BODY

TECHNICAL FIELD

The invention refers to a hovering body, especially a helicopter, equipped with an autonomous drive for setting the body in motion especially in a free liquid environment and also equipped with at least one mechanism for optional control of direction and/or position of its hovering motion implemented in the form of an elongated-shaped elongated basic jacket, the basic jacket being equipped along its longitudinal axis with at least one slot jet for controlled ejection of liquid from the internal environment of the basic jacket into a free liquid environment. On its outer side, the slot jet comprises a cover which is with its one side connected with the basic jacket and is on its other side in the area of its outlet edge set at a distance from the basic jacket.

STATE OF THE ART

So far known solutions of hovering bodies equipped with an autonomous drive for setting a body in motion in a free liquid environment are perforce equipped with a suitable, feasible mechanism for optional control of direction and/or position of the hovering motion to ensure adjustable parameters of its direction and/or position at any given moment, which is usually manifested in any hovering bodies which move in a hovering way in liquid, e.g. ships or submarines, or move in air which e.g. aeroplanes or helicopters usually in the form of an elongated basic jacket where covering profile is constructed as a close joint curve, smooth in parts. Such a basic jacket is then equipped with at least one outlet jet for controlled ejection of liquid from its internal environment into a free liquid environment to fulfil the basic functions of setting and changing direction and/or position of the hovering body. Comparable known solutions of mechanisms for optional control of direction and/or position of hovering motion are mostly applied in such hovering bodies, largely in helicopters, where a quick change of position or motion seems to be most desirable due to their utilisation functions, the solution described in the French patent file No. 1332300, which stems from the technical utilisation of Coand's effect, represents in the case of their utilisation in hovering bodies constructed as helicopters a significant step forward in known comparable implementation of mechanisms at this time for optional changing of direction and/or position of hovering motion.

Concurrently, the said patent is followed by another solution which could be considered even more progressive and which is described in U.S. Pat. No. 4,200,252 where the solution, in contrast with the previous one, tries to solve the problem of system of operation for a helicopter where the previously proposed system of anti-momentum compensation is not efficient or adequate. Another significant comparable solution is the European patent file No. 0524044 which is extremely demanding from the technical as well as technological point of view in that it combines the classical rotary compensatory system with the circulatory system. Such a solution is operationally very complicated and no practical application has, as yet, been found for it. The only more efficacious solutions to the problem of optional control of direction and/or position of the motion of a hovering body in a free liquid environment are those demonstrated in the case of helicopters by U.S. company McDonnel Douglas, based on the above mentioned U.S. Pat. No. 4,200,252. The said solution is fully functional in all the systems of operation concerning the hovering motion of a helicopter, nevertheless its mechanism for optional control of direction and/or position of hovering motion of the helicopter is, due to its relatively low efficiency caused by a low ceiling on the coefficient of compensatory momentum unfortunately leads to its extraordinarily great external phasing out dimensions and thus also to a higher weight. The weight is significantly increased even further by the necessity of using low-pressure slot jets, as these significantly and unfavorably lower torque and flexion durability of the entire mechanism for optional control of direction and/or position in such machines. Such a reduction of stress in this solution is dependent on the inherent disruption of circumambient flow of the jacket surface tension mechanism for optional control of direction and/or position of hovering motion of a helicopter in those places where the low-pressure slot jets are located.

U.S. Pat. No. 5,676,335 describes a control system of air flow for a helicopter comprising a direction control system of the helicopter in whose arm of its tall there are provided two jet slots connecting the inner space of the tail arm with the environments. The front part of the tall arm comprises a ventilator (blower) driving air stream into the cavity provided in the arm and forces the air to flow out into outer space. The slots get steplessly narrower in the direction of the air stream going out through them and thus ensure the laminar air flow as far as its outlet in its terminal part and further on along the tail arm. The drawback of this solution consists in the low efficiency of the direction control system as a consequence of the laminar flow of the air stream going out of the terminal parts of the slots. The slots are longitudinal and big-sized to ensure the laminar flow which places heavy requirements on the measures for ensuring sufficient strength of the body they are made in.

DISCLOSURE OF INVENTION

The above problems are solved and the defiencies of the known solutions are removed by the hovering body according to the invention whose principle consists in that under the cover of the slot jet there is provided one vent or a plurality of vents passing through the basic jacket, that the cover is in the area of the vents set at a distance from the basic jacket and creates outside the vents a turbulizing area which is with the free liquid environment connected by means of an outlet slot between the outlet edge of the cover and the basic jacket and that the aggregate surface of the cross sections of the vents under the cover is superior to the surface of the outlet cross section between the outlet edge of the cover and the outer surface of the basic jacket.

Furthermore, use of the patent achieves a suitable solution for a hovering body due to for the significant reduction of its weight and phasing out dimensions of the mechanism for optional control of direction and/or position of the hovering body by the fact that the basic jacket is connected via its internal surface to the source of liquid pressure with the compression coefficient being at least 1.1. Even greater enhancement of the efficiency of the mechanism for optional control of direction and/or position of hovering motion of the hovering body, according to the invention taking into account the contemplated characteristics of its system of operation, was achieved by the fact that the basic jacket is equipped with two slot jets arranged in tangential direction of the external surface of the basic jacket in the angular spacing in the range of 20° to 80°. Another significant improvement of the complex operational possibilities of the hovering body according to the invention was achieved specifically by the fact that the basic jacket is connected to a mechanism for optional stabilisation of direction and/or position of the hovering motion, said mechanism being carried out in the shape of an elongated jacket made as a closed jacket profile, where the elongated jacket has attached thereto at least one uplift component whose boarder attack passes into the outer surface of the elongated jacket in the chief horizontal plane of symmetry of the basic jacket_by the joint curve of the inflection points of contact of the uplift component in which the uplift component (24) has a convex or concave surface and in the unrolled shape of the uplift component into the chief horizontal plane of symmetry of the basic jacket (1) the ratio of the longitudinal dimension of the boarder attack to the longitudinal dimension of the end place (26) is superior to one, and the mean curve of the transverse profiles projected onto the normal plane according to the main horizontal plane of symmetry of the basic jacket, it forms an arc where the angle of its tangent at the level of the boarder attack differs from the angle of the tangent at the level of the outlet edge of the uplift component.

Furthermore, the invention offers a suitable solution for a hovering body for a significant reduction of its weight as well as phasing out dimension of the mechanism for optional control of direction and/or position by the fact that the basic jacket together with the longitudinal jacket forms an integral unit. Thus, the solution according to this invention achieves even better results of the aforesaid hovering body, according to the invention, by the fact that the end place of the uplift component is arranged at a distance from the external surface of the longitudinal jacket. Moreover, the invention achieves a possible suitable solution for a hovering body due to the demonstrable improvement of parameters of its operational properties, as well as functional reliability, by the fact that the end place of the uplift component is arranged in contact with the external surface of the longitudinal jacket, which is at a distance from the point of contact between the boarder attack of the uplift component and the external surface of the longitudinal jacket. In this manner, a closed uplift component is created. The invention provides even further improvement of the application of the solution for a hovering body, including the aspects of acquisition cost, economy, operational reliability, and functional service life by the fact that at least one of the uplift components is equipped with a multi-directional reactive jet interconnected with the inner space of the basic jacket for controlled ejection of liquid from the internal environment of the basic jacket into a free liquid environment.

The advantages of constructing the hovering body according to the invention can be seen especially in the fact that, as well as maintaining the properties of current known comparable solutions, its concept for creating the mechanism for optional control of direction and/or position of hovering motion of the proposed hovering body is simple as it is set in motion by its autonomous drive, which is in the form of a carrying rotor. The mechanism for optional control of direction and/or position of the hovering motion of the hovering body according to the invention represents a very efficient construction framework, which by its technically simple and economically undemanding technical means provides for achieving all the required operational properties of a hovering body, especially a helicopter, in the operational regime for a stable position, e.g. in the operational regime when a helicopter hovers in place, as well as in all the operational regimes of dynamic motion. Due to a higher fall in the pressure gradient in comparison with current known low-pressure systems we can achieve, at the level of the outlet edge of the cover of slot jet, a significantly higher relative average speed in an arbitrary point of Coand's flow, as it is more turbulent than the equivalent level of turbulence of existing Coand's flow systems, which can be considered a significant advantage of the solution of a hovering body according to the invention.

The value of the absolute speed of Coand's flow remains clearly subsonic. Higher energy potential of Coand's flow allows for achieving a markedly higher real bending polarisation of the flow of liquid in the surroundings of the basic jacket of the mechanism for optional control of direction and/or position of the hovering motion of the hovering body according to the invention as well as reaching a higher coefficient of equivalent buoyancy, which enables creation of such a mechanism for optional control of direction and/or position of the hovering body according to this invention with significantly lower phasing out dimensions and, therefore, also significantly lower weight. Hence, the hovering body according to the invention, with regard to the concrete proposed conditions of its optimal operation in service, can advantageously use a whole range of possibilities of variation of quantity, its own creation and disposition arrangement of the said slot jets and their correspondent vents or covers moulded in the basic jacket of the mechanism for optional control of direction and/or position of the hovering body, where yet more possible ways of creating of a hovering body according to the invention with regard to its concrete proposed conditions of operation and due awareness of the given physical properties of the surrounding liquid environment, there are still a whole range of variations of solutions for a mechanism for optional stabilisation of direction and/or position of the hovering motion, especially with regard to the number, shape and mutual dispositional arrangement of uplift components, concretely manifested, where all the variations of creating a hovering body according to the invention can be appropriately and advantageously constructed, even with regard to the optimisation of its operational properties as far as the lowest level of acquisition costs as well as the extreme technological standards of its real production and achievement of the highest possible operational reliability and functional service life, while fulfilling guaranteed and fault-free requisite functions of the hovering body in any system of operation of hovering which is undoubtedly assisted by such a formation of its elongated jacket, where at least one of the uplift components is equipped with a multi-directional jet for controlled ejection of liquid from the internal environment of the basic jacket, which is integrally connected to the elongated jacket, into a free liquid environment.

BRIEF DESCRIPTION OF THE DRAWINGS

The invention will be described in more detail via the attached drawings where

FIG. 11 illustrates a solution according to FIG. 5 and FIG. 6 where vertical lower liquid circumfluence around its uplift components is schematically marked while

BEST MODE FOR CARRYING OUT THE INVENTION

Figure 1:
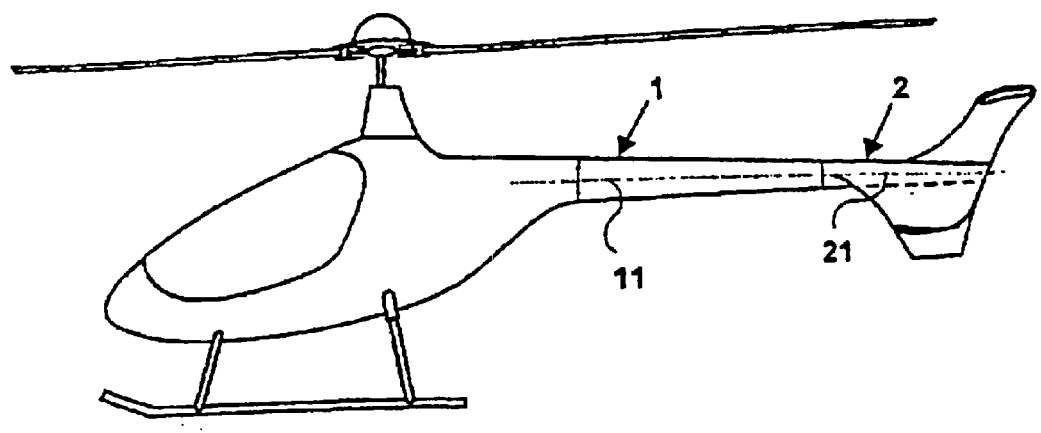
FIG. 1 illustrates a solution for the hovering body according to the invention presented by a helicopter in a schematic longitudinal view.
Figure 2:
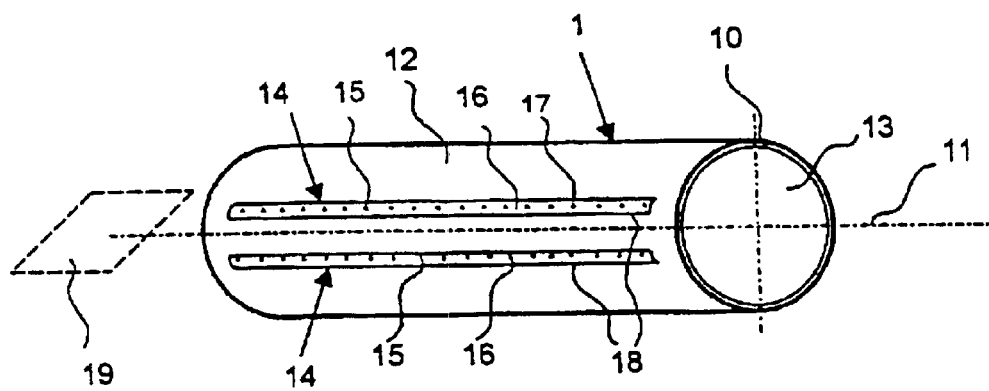
FIG. 2 illustrates a solution for the basic jacket of the mechanism for optional control of direction and/or position of the hovering motion according to FIG. 1 in a schematic longitudinal view.

A hovering body according to the invention carried out for example, in the form of a ship, submarine, aeroplane, or helicopter as illustrated in FIG. 1, which means such a hovering body, which hovers under control in a specific way in a free liquid environment due to its autonomous drive, is usually equipped with at least one mechanism for optional control of direction and/or position of the hovering motion carried out in the form of the elongated basic jacket 1 of mainly cigar shape where the covering profile is carried out as a closed joint curve smooth in parts. To ensure optional control of direction and/or position of the hovering motion of the hovering body said basic jacket 1 is equipped with at lest one slot jet 14 arranged on the basic jacket 1 in the direction of its longitudinal axis 11 serving for controlled ejection of liquid from the internal environment of the basic jacket 1 into a free liquid environment. According to FIG. 2 and FIG. 3 it is clearly visible that the correspondent slot jet 14 constructed on the basic jacket 1 is implemented as one and/or more vents 15 which pass_through the rings 10 of the basic jacket 1 and also as at least one cover 16 adapted on the basic jacket 1 in the direction correspondent with the direction of its longitudinal axis 11. FIG. 2 illustrates that the cover 16 is in the position of the longitudinal axis 11 of the basic jacket 1 where it lies within the main horizontal plane 19 of symmetry of the basic jacket 1 arranged by its boarder attack 17 adjacent, in the stipulated position of the cover 16 to the main horizontal plane 19 of symmetry of the basic jacket 1, to the upper top circumferential point of the external surface 12 of the basic jacket 1 in contact with the external surface 12 of the basic jacket 1. When contemplating the same position of the cover 16 to the main horizontal plane 19 of symmetry of the basic jacket 1, the cover 16 is arranged with its outlet edge 18 averted from the upper top point of the external surface 12 of the basic jacket 1 at a distance from the external surface 12 of the basic jacket 1. From the above mentioned FIG. 2 and FIG. 3 it is clear that each of the created vents 15 always arranged between the boarder attack 17 of the cover 16 and the outlet edge 18 of the cover 16 is on the basic jacket 1, where the creation of the body as well as the spatial arrangement of the vents 15 and their corresponding covers 16 is, advantageously, such that the total surface area of sections of the vents 15 is always larger than the surface of outlet section in the place there is a gap between of the outlet edge 18 of the cover 16 and the external surface 12 of the basic jacket 1.

As is visible from the preceding, the slot jet 14 comprises on its outer side the_cover 16 which is with one of its sides connected with the basic jacket 1 whereas on its other side, it is set apart from the basic jacket 1 in the area of its outlet edge 18. Situated under the cover 16 of the slot jet 14 is a vent 15 or a plurality of vents 15 passing through the basic jacket 1, and the cover 16 is in the area of the vents 15 set at a distance from the basic jacket 1 and creates a turbulizing space outside the vents 15 which is by means of the outlet gap situated between the outlet edge 18 of the cover 16 and the basic jacket 1 connected with the free liquid environment To guarantee the required functions of the hovering body according to the invention, presented especially in the case of a helicopter, it is crucial that the basic jacket 1 is attached to its pertaining source of pressure with a compression factor of at least 1,1. The liquid is in this case gas (air).

Figure 3:
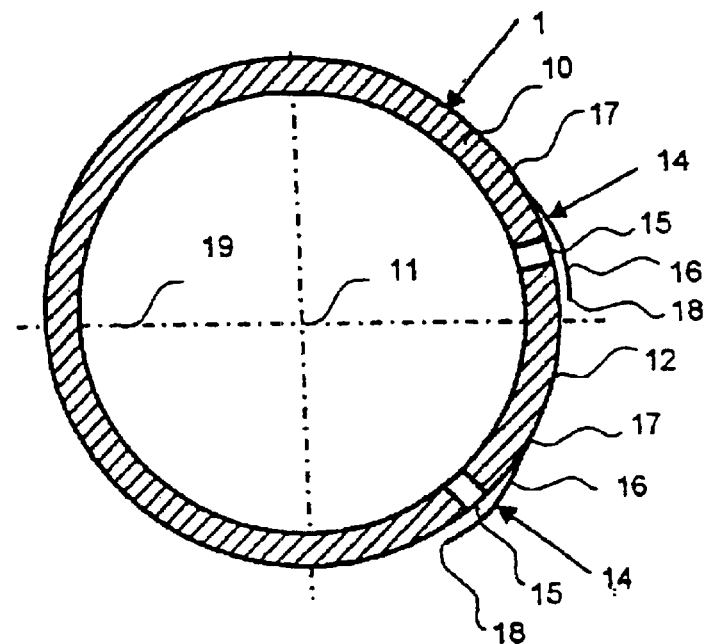
FIG. 3 illustrates a solution for the basic jacket according to FIG. 1 and FIG. 2 in cross section.
Figure 5:
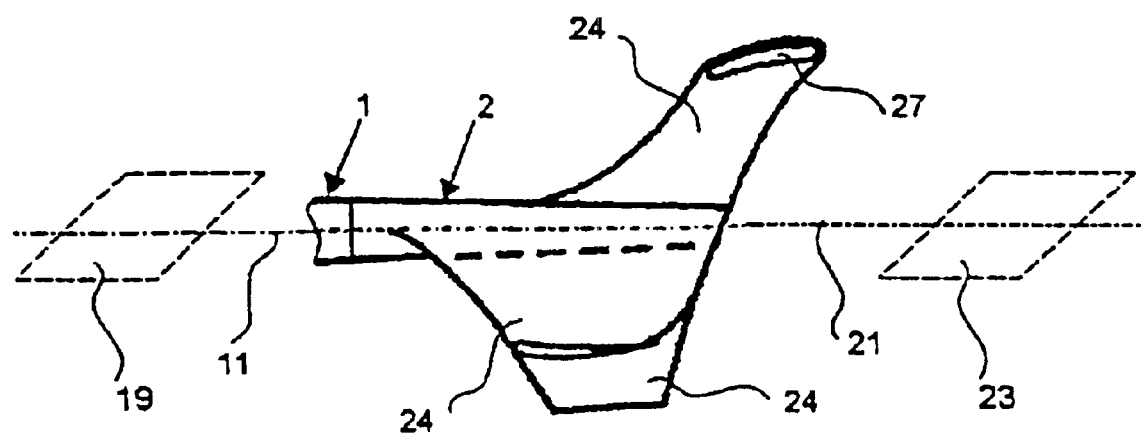
FIG. 5 illustrates a solution for the elongated jacket of the mechanism for optional stabilisation of direction and/or position of the hovering motion according to FIG. 1 in a schematic longitudinal view.
Figure 6:
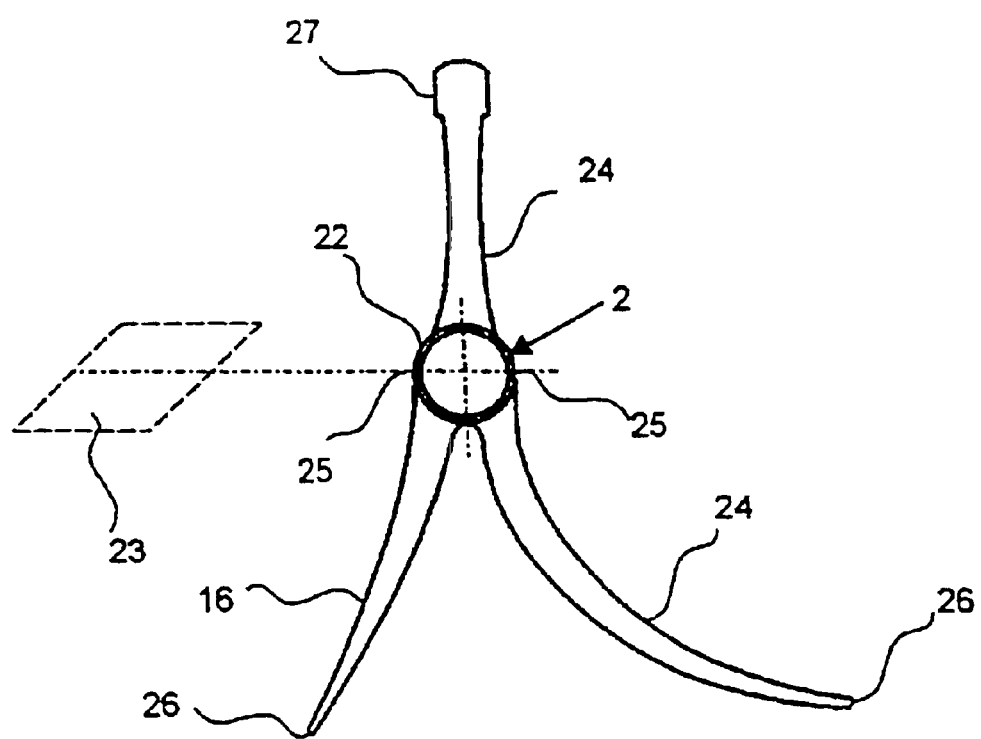
FIG. 6 illustrates a solution for the elongated jacket according to FIG. 5 in cross section.
Figure 7:
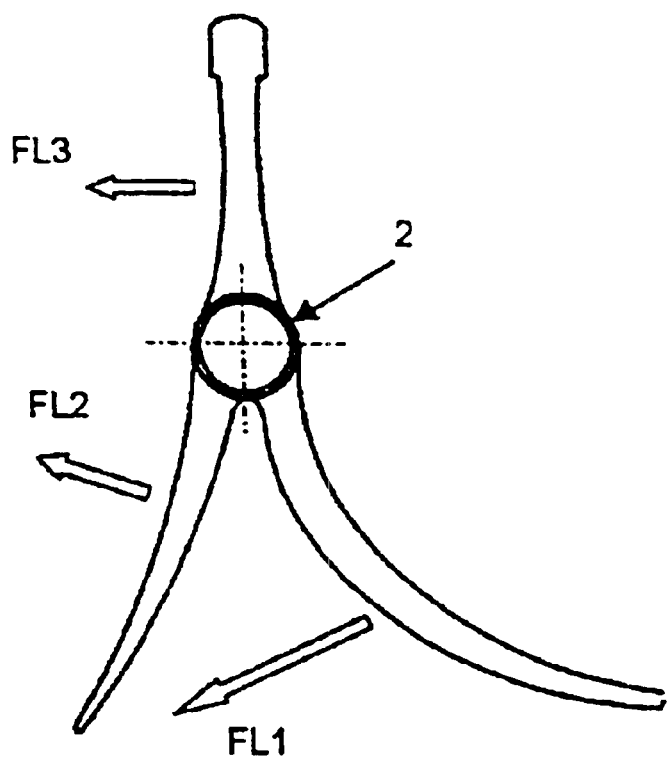
FIG. 7 illustrates a solution according to FIG. 5 and FIG. 6 where the liquid circumfluent around its uplift components in the forward motion of the hovering body is schematically marked.
Figure 8:
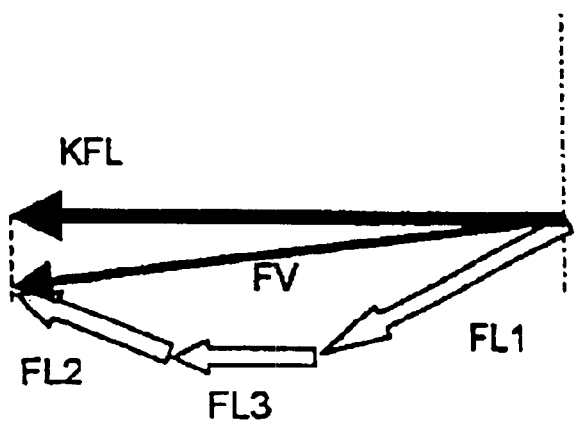
FIG. 8 illustrates the resolution of forces in circumfluent liquid according to FIG. 7.
Figure 9:
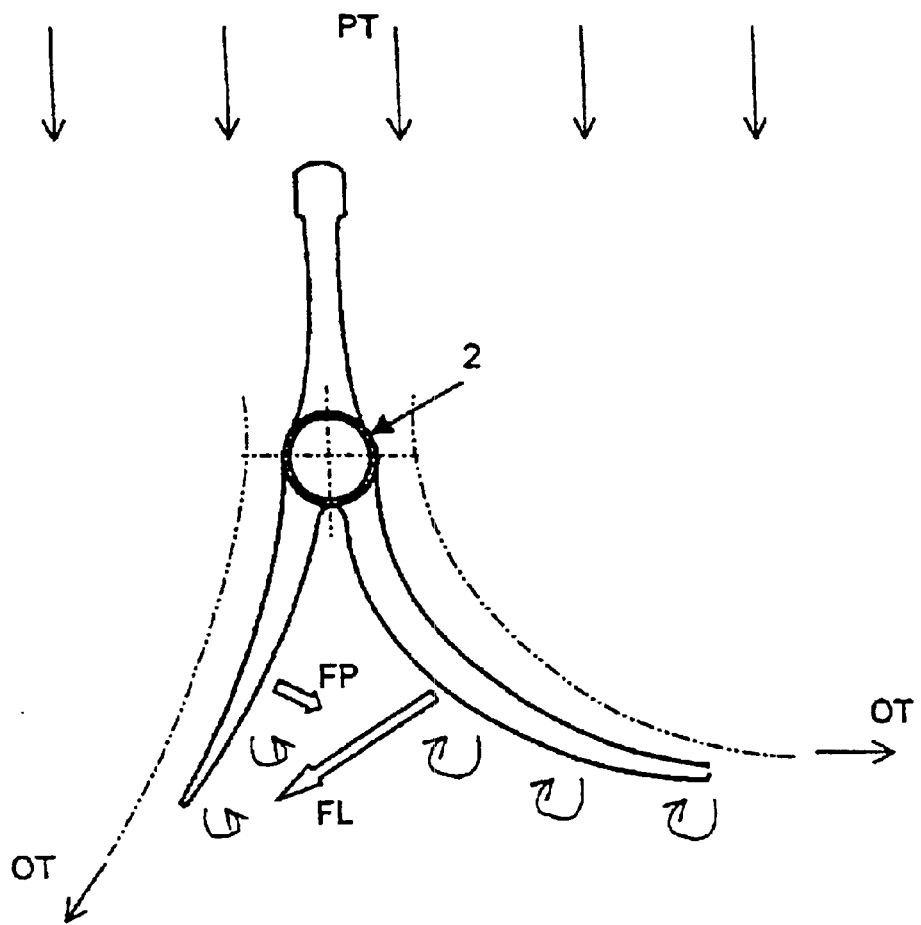
FIG. 9 illustrates a solution according to FIGS. 5 and 6 where the vertical upper liquid circumfluence around its uplift components is schematically marked.
Figure 10:
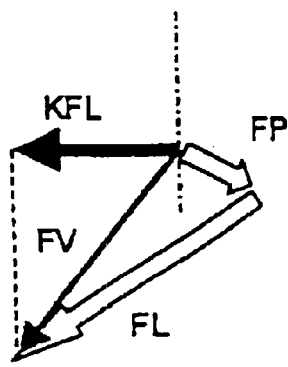
FIG. 10 illustrates the resolution of forces in vertical upper liquid circumfluence as marked in FIG. 9.

To achieve practical controllability and navigability in each proposed operational regime of the hovering body according to the invention, especially in the case of a helicopter, the basic jacket 1 is equipped with two slot jets 14 arranged at a mutual angular distance of 20° to 80° in relation to the longitudinal axis of the basic jacket 1 as illustrated in FIG. 3. Further significant improvement of the required controllability and navigability is provided by such an implementation according to the invention, where a mechanism for optional control of direction and/or position of the hovering motion is connected to one side 13 of the basic jacket 1 as it is schematically illustrated in FIG. 1 and further in FIG. 5 and FIG. 6. Such a mechanism for optional stabilisation of direction and/or position of the hovering motion is carried out in the form of an elongated jacket 2 made as a closed covering profile where its longitudinal axis 21 is in the shown embodiment identical with the longitudinal axis 11 of the basic jacket 1 while the main horizontal plane 23 of symmetry of the elongated jacket 2 is identical with the main horizontal plane 19 of symmetry of the basic jacket 1. The said elongated jacket 2 is equipped with one and/or more uplift components 24 each of which is on the external surface 22 of the elongated jacket 2 arranged in the direction corresponding with the direction of the longitudinal axis 21 of the elongated jacket 2. The relevant uplift component 24 has in the area where it passes into the outer surface of the elongated jacket 22 a boarder attack 25 consisting of a continuous curve of inflection points of contact of the uplift component 24 with the outer surface 22 of the elongated jacket 2. The uplift component 24 has a convex or concave surface, and in the unrolled shape of the uplift component 24 into the main horizontal plane 19 the ratio between the longitudinal dimension of the boarder attack 25 and the longitudinal dimension of the end part 26 of the uplift component 24 is superior to one while_the mean curve of cross profiles of the uplift component 24 projected onto the normal plane to the main horizontal plane 19 of symmetry of the basic jacket 1 form an arc, where the angle of its tangent at the level of the boarder attack 25 of the uplift component 24 differs from the angle of its tangent_at the level of the end place 26 of the uplift component 24. It seems quite natural that among the best modes for carrying out the invention will be such a solution for a hovering body according to the invention where the basic jacket 1 together with the elongated jacket 2 forms an integral unit as is illustrated in FIG. 1, in the case of the best mode for carrying out the hovering body according to the invention in the form of a helicopter hovering in the air. To ensure the requisite level of controllability and navigability of the hovering body according to the invention in the proposed operational systems we can assume such a solution to be advantageous, where the uplift component 24 is arranged by its end place 26 at a distance from the external surface 22 of the elongated jacket 2 as illustrated in FIGS. 5 to 7 where for other specific operational regimes of the hovering body we can assume such a constructed uplift component 24 that it is advantageous and it is arranged by its end place 26 in contact with the external surface 22 of the elongated jacket 2 and it is at the same time arranged at a distance from the point of contact of the boarder attack 25 of the uplift component 24 with the external surface 22 of the elongated jacket 2. As schematically illustrated in FIGS. 1, 5, and 6 to ensure secure orientation stability of the hovering body according to the invention even in spatial dynamic controllable changes of its direction and/or position, it is equipped with at least one from the, as already mentioned, arranged uplift components 24, multi-directional reactive jet 27 interconnected with the inner space of the basic jacket for controlled ejection of liquid from the internal environment of the basic jacket 1 into a free liquid environment.

The principle of the function of the hovering body, according to the invention carried out in the best mode in the form of a helicopter, is as follows.

Figure 4:
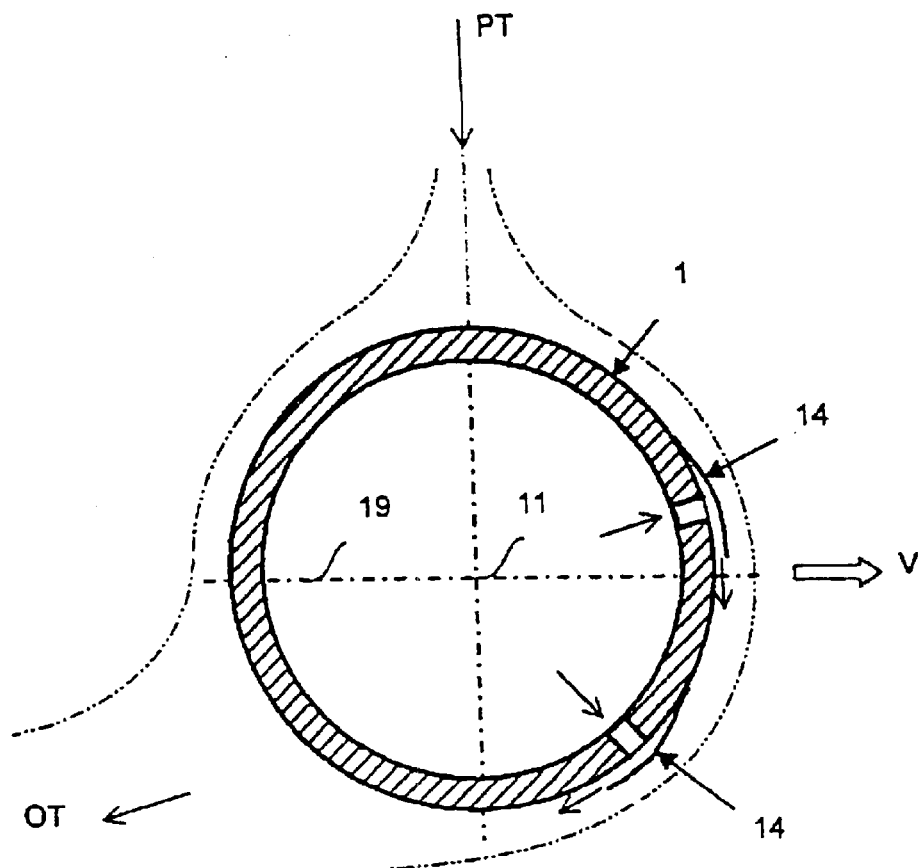
FIG. 4 illustrates a solution for the basic jacket according to FIGS. 1 to 3 in cross section where the direction of the flow of the liquid circunfluent around the hovering body is schematically marked.

Introducing the best mode for carrying out a helicopter, shown in principle in FIGS. 1 to 12 by means of its autonomous drive, i.e. a carrying rotor, set in the hovering motion in the air where the air flows through the carrying rotor and is accelerated in the direction down to the tail end of the helicopter and thus also to circumfluence of the basic jacket 1 with its appropriately created slot jets 14 and also of the elongated jacket 2 and individual uplift components 24. The vector of velocity of the descending flow of the air is further combined with the vector of velocity of the forward and/or other spatial motion. The flow of air of the given resultant vector circumfluent around the basic jacket 1 is divided into two parts, where part of the air flow circumfluent around a part of the external surface 12 of the basic jacket 1 on which the slot jets 14 are arranged is accelerated by Coand's flow generated by_the slot jet 14, where the air slows from the necessarily utilised source of controlled pressure of air with a compression coefficient of at least 1.1, as not shown in the attached drawings. Extreme increases in the level of turbulence and thus also of the Coand's flow are reached particularly by double gradual expansion of pressure air at the level of the outlet from the vents 15 under the cover 16 and on the ejection from the outlet edge 18 of the cover 16. Coand's flow, generated by the slot jet 14 according to the invention, is extraordinarily highly turbulent having high relative average velocity at each point of such a flow, where the average pressure at any equivalent point of the said Coand's flow is lower than in any point of free flow by which, according to known patterns of circumfluence around curved surfaces of bodies, the flow of the circumfluent air, marked in FIG. 4 as OT, presenting generally the direction of the circumfluent liquid bends significantly. Such a significant real bending of the circumfluent air is further, in an advantageous solution for the hovering body according to the invention, achieved by a suitable creation of spatial configuration utilising two slot jets 14 on the external surface 12 of the basic jacket 1 in such a way that the second slot jet 14 is arranged at such a tangential distance from the first slot jet 14 to create better conditions for adherence of the Coand's flow emerging already from the first slot jet 14, as here both Coand's flows generated by the slot jets 14 combine. Hence, as it is known the resultant uplift force V comes about, as shown in FIG. 4, as a vector perpendicular to the direction PT of the velocity of the entering air and the resultant uplift force V is in the case of carrying out the body according to the invention in this illustrated best mode for carrying out, in the form of a helicopter, utilised to compensate the torque momentum emerging as a consequence of the function of the carrying rotor which ensures the autonomy of motion of the helicopter. We can deduce easily from FIG. 4 that the magnitude of the said resultant uplift force V can be positively influenced by means of regulating functional parameters of the necessarily utilised source of controlled air pressure, thus we can also efficiently influence the direction and/or position of the helicopter in the air.

Figure 11:
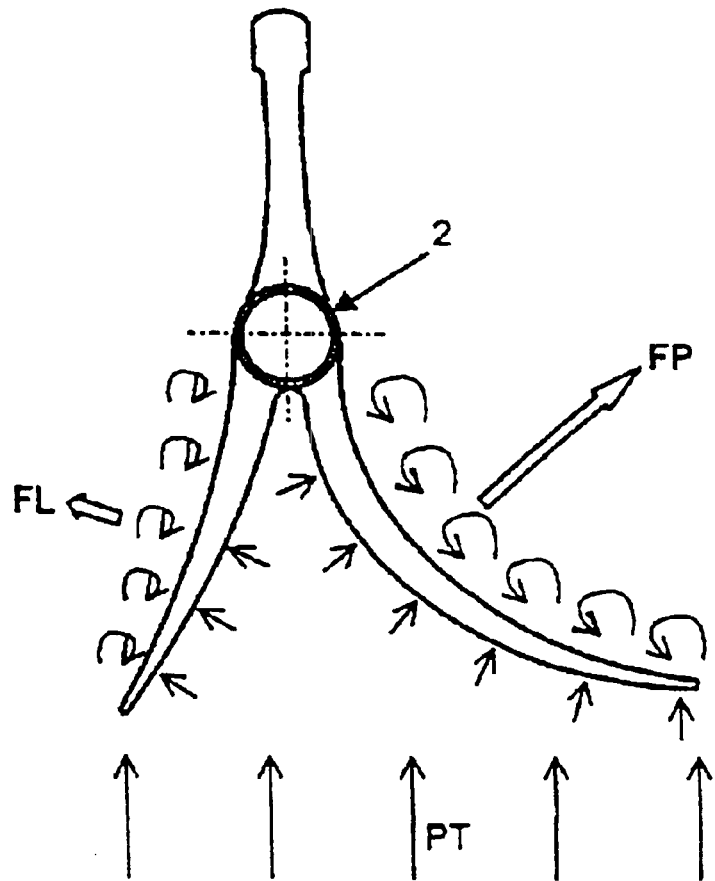
Figure 12:
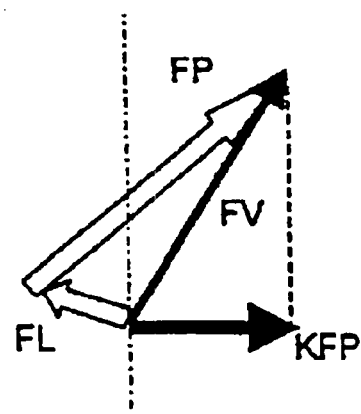
FIG. 12 illustrates the resolution of forces in vertical upper liquid circumfluence as marked in FIG. 11.

FIG. 11 shows that best mode for carrying out the elongated jacket 2 with three uplift components 24 in a cross-section according to FIGS. 5 and 6 where the principal function of the said uplift components 24 is marked in their circumfluence in the downward direction PT of the entering air, which corresponds with, for example, the operation of descent of the helicopter. This function is shown in FIG. 12 as the sum of the individual aerodynamic and dynamic forces coming into being on the uplift components 24 and these are the resultant left-hand force FL and the resultant right-hand force FP and from the position of the resultant uplift force FV shown in FIG. 11 it is clear that the resultant uplift force FV in the same horizontal projection, that means in its arrangement in the main horizontal plane 23 of symmetry of the elongated jacket 2 as well as in the main horizontal plane 19 of symmetry of the basic jacket 1, marked as the resultant right-hand compensatory force KFP which is oriented to the right by which, in the operational regime of descent of the helicopter, i.e. in the system that corresponds with a significant reduction of the torque momentum of the carrying rotor according to the total reduced energy input needed for the descent of a helicopter, takes part in the balance of the forces and stability of the motion of the helicopter. This function, shown in FIG. 12, is extraordinarily important also and mainly in the operational regime of the autorotation of the helicopter, when it is necessary to compensate with anti-momentum the force contrary to the autonomous motor flight of a helicopter.

It is clear that other variants of different operational regimes of the hovering motion of the helicopter carried out according to the invention will always be a combination of different acting resultant forces, e.g. as shown above on the three basic mentioned examples of the function of the hovering body according to the invention carried out in the form of a helicopter, but also of other different resultant forces, where the optional objective was predominantly suitably selected when solving the mutual position and shape of individual uplift components 24 being such that their spatially arranged geometric design in which optional stability of direction and/or position of the hovering body, undisturbed in the course of the hovering motion by any external force, is achieved most advantageously according to the invention in a free liquid environment.

Autonomous used uplift components 24 of the elongated jacket 2 are, nevertheless, carried out mainly depending on the utilised values of Reynold's number in such a way that their individual parts and groupings of profiles show the highest and/or lowest efficiency of their function depending on concrete conditions of the hovering motion of the helicopter which as a result leads to even greater and more significant increase of functionality of these uplift components 24.

Utilising parameters which define the value of Reynold's number in constant kinematic viscosity of a liquid environment that means the characteristic dimension and, concretely, in the proposed example the values of the depth of the individual profiles of the uplift components 24 multiplied by instantaneous hovering forward velocity of the hovering body according to the invention, such stabilisation ratios of the mechanism for optional stabilisation of direction and/or position of the hovering motion have already been reached at the point of the proposed concrete construction of the body of the mechanism together with the required optional directionality of the resultant vector of the stabilisation force of the whole of the said mechanism which both lead to a significant decrease in the extreme requirements of the supplementary stabilisation of direction and/or position of the hovering body according to the invention in the whole range of the operational velocities and systems of the hovering motion of the hovering body according to the invention.

THE INDUSTRIAL APPLICABILITY

The solution for the hovering body according to the invention is multilaterally utilisable in any hovering bodies which move in a hovering fashion in liquid e.g. ships or submarines, or e.g. aeroplanes or helicopters, which move in a hovering fashion in air.

What is claimed is:

1. A hovering body, especially a helicopter, comprising an autonomous drive to set the hovering body in hovering motion in a free fluid environment, the body having at least one mechanism for optional control of at least one of a directional motion and a position in free space of the hovering body, and the at least one mechanism comprising an elongated basic jacket, which in a direction of its longitudinal axis includes at least one slot jet for controlled ejection of a fluid from an internal environment of the basic jacket into the free fluid environment, the at least one slot jet comprises a cover on its outer side, the cover includes one side connected with the basic jacket and includes another side in the area of its outlet edge set at a distance from the basic jacket, respectively under the cover of the at least one slot jet there is at least one vent passing through the basic jacket, the cover is in the area of the at least one vent set at a distance from the basic jacket for creating outside the at least one vent a turbulizing area which is with the free fluid environment connected by means of an outlet slot between the outlet edge of the cover and the basic jacket, and the aggregate surface of the cross section of the at least one vent under the cover is greater than the surface of the outlet cross section between the outlet edge of the cover and the outer surface of the basic jacket, wherein the basic jacket has a mechanism connected thereto for optional stabilization of at least one of the directional motion and the position in free space of the hovering body, the stabilizing mechanism comprising an elongated jacket closed cover profile where the elongated jacket having connected thereto at least one uplift component, the at least one uplift component having at least one of a convex and a concave surface, wherein the uplift component is configured to produce a force on the elongated jacket when acted upon by a second fluid within the free fluid environment, the uplifting member also having a boarder attack, the boarder attack including a surface area of contact between the uplift component and an external surface of the elongated jacket where the uplifting member mounts to the external surface of the cover profile of the elongated jacket, the surface area includes a continuous curve of inflection points of contact of the uplift component with the outer surface of the elongated jacket, in which in the unrolled shape of the at least one uplift component into a main horizontal plane of symmetry of the basic jacket the ratio of the longitudinal dimension of the boarder attack to a longitudinal dimension of the end place is greater than one, and the mean curve of the traverse profiles, projected on the plane normal to the main horizontal plane of symmetry of the basic jacket makes an arc the angle of whose tangent at the level of the boarder attack is different from the angle of the tangent at the level of the end place of the uplift component.

2. The hovering body according to claim 1, wherein the basic jacket together with the elongated jacket form an integral unit.

3. The hovering body according to claim 1, wherein the at least one uplift component is by its end place arranged in a distance from the external surface of the elongated jacket.

4. The hovering body according to claim 1, wherein the at least one uplift component is equipped with a multi-directional jet connected with the inner space of the basic jacket for the controlled ejection of the fluid from the internal environment of the basic jacket into a free fluid environment.

5. The hovering body according to claim 1, wherein the at least one uplift component is by its end place arranged in contact with the external surface of the elongated jacket which is at a distance from the position of contact of the boarder attack of the respective at least one uplift component.

6. The hovering body according to claim 2, wherein the at least one uplift component is equipped with a multi-directional jet connected with the inner space of the basic jacket for the controlled ejection of the fluid from the internal environment of the basic jacket into a free fluid environment.

7. The hovering body according to claim 3, wherein the at least one uplift component is equipped with a multi-directional jet connected with the inner space of the basic jacket for the controlled ejection of the fluid from the internal environment of the basic jacket into a free fluid environment.

8. The hovering body according to claim 5, wherein the at least one uplift component is equipped with a multi-directional jet connected with the inner space of the basic jacket for the controlled ejection of the fluid from the internal environment of the basic jacket into a free fluid environment.

9. A hovering arrangement comprising:
a body;
an autonomous drive coupled to the body and configured to hover the body in a free fluid environment;
at least one control mechanism coupled to the body and configured to control at least one of a directional motion and a position in free space of the body, the control mechanism including a basic jacket having an inner space and an external surface, the external surface of the jacket being provided with at least one slot jet to control an ejection of a fluid from the inner space of the jacket to the free fluid environment, the slot jet including a cover and including at least one vent extending from the external surface of the basic jacket to the inner space of the basic jacket, the vent having a cross section, the cover having first and second sides, the first side being connected to the external surface of the basic jacket, the second side being arranged in an area of the vent and separated from the vent to form an outlet slot having a cross section smaller than the cross section of the vent; and
a stabilization mechanism coupled to the basic jacket of the control mechanism, the stabilization mechanism including an elongated basic jacket having an inner space and an external surface, the external surface of the elongated jacket being provided with at least one uplift component, the uplift component including a boarder attack, a proximal end, and a distal end, the boarder attack being formed at the proximal end of the uplift component, the boarder attack having a continuous curve of inflection points of contact between the uplift component and the external surface of the elongated jacket, and being configured to couple the uplift component to the external surface of the elongated jacket, wherein the uplift component is configured to produce a force on the elongated jacket when acted upon by a second fluid of the free fluid environment, the force having at least a normal vector with respect to a longitudinal axis of the elongated jacket, wherein the ejection of the fluid from the inner space of the basic jacket to the free fluid environment forms an area of turbulent flow in the free fluid environment adjacent to the outlet slot of the slot jet.

10. The hovering arrangement according to claim 9, wherein the uplift component includes at least one of a concave surface and a convex surface between the distal and the proximal ends.

11. The hovering arrangement according to claim 9, wherein the basic jacket and the elongated jacket form an integral unit.

12. The hovering arrangement according to claim 9, further comprising a first dimension measuring a linear distance from the boarder attack to the distal end of the uplift component and a second dimension measuring a linear distance along the contact surface of the boarder attack, wherein a ratio between the first and second dimensions is greater than one.

13. The hovering arrangement according to claim 9, wherein a mean curve of a normal component relevant to a main horizontal plane of the elongated jacket forms an arc, the arc having a plurality of angles, the angles including a first tangent angle at the boarder attack and a second tangent angle at the distal end, wherein the first tangent angle differs from the second tangent angle.

14. The hovering arrangement according to claim 9, wherein the at least one slot jet includes at least one multidirectional jet interconnected with the inner cavity of the basic jacket to control the ejection of the fluid from the inner space of the basic jacket to the free fluid environment, the multidirectional jet being respectively mounted to the distal end of the uplift component.

\* \* \* \* \*